(12) United States Patent
Houck et al.

(10) Patent No.: US 7,802,951 B2
(45) Date of Patent: Sep. 28, 2010

(54) ANTI-ROTATIONAL ADHESIVE INSERT

(75) Inventors: Joel Houck, Lansing, IL (US); Gerald W. Hagel, Lombard, IL (US)

(73) Assignee: Sandisk Corporation, Milpitas, CA (US)

( * ) Notice: Subject to any disclaimer, the term of this patent is extended or adjusted under 35 U.S.C. 154(b) by 637 days.

(21) Appl. No.: 11/612,356

(22) Filed: Dec. 18, 2006

(65) Prior Publication Data

US 2008/0141613 A1    Jun. 19, 2008

(51) Int. Cl.
F16B 39/02    (2006.01)
(52) U.S. Cl. .......................................... 411/82; 411/416
(58) Field of Classification Search .................. 411/82, 411/258, 930, 416; 52/853, 857
See application file for complete search history.

(56) References Cited

U.S. PATENT DOCUMENTS

| | | | | |
|---|---|---|---|---|
| 3,249,142 A | * | 5/1966 | Phipard, Jr | 411/311 |
| 3,561,185 A | * | 2/1971 | Finsterwalder | 52/853 |
| 4,137,686 A | * | 2/1979 | Kern | 52/853 |
| 4,229,501 A | * | 10/1980 | Kern | 428/399 |
| 4,308,705 A | * | 1/1982 | Hufnagl | 52/853 |
| 4,584,247 A | * | 4/1986 | Mulholland | 428/592 |
| 4,790,703 A | * | 12/1988 | Wing | 411/260 |
| 4,811,541 A | * | 3/1989 | Finsterwalder | 52/853 |
| 5,634,752 A | * | 6/1997 | Haage et al. | 411/82 |
| 5,735,653 A | * | 4/1998 | Schiefer et al. | 411/82 |
| 6,029,417 A | * | 2/2000 | Leibhard et al. | 52/705 |
| 6,240,696 B1 | * | 6/2001 | Ludwig et al. | 52/698 |
| 6,514,013 B2 | * | 2/2003 | Li et al. | 405/259.5 |

* cited by examiner

*Primary Examiner*—Flemming Saether
(74) *Attorney, Agent, or Firm*—Vierra Magen Marcus & DeNiro LLP

(57) ABSTRACT

An adhesive insert includes a first end and a second end, and comprises a threaded portion at the first end, the threaded portion having a circular cross-section. A securing portion is provided at the second end, the securing portion including an anti-rotation structure formed therein which resists rotation of the insert under cyclic loading by the building element. The anti-rotation structure may be a triobular cross-section formed in the securing portion. Other anti-rotation structures are provided.

20 Claims, 5 Drawing Sheets

FIG. 2A
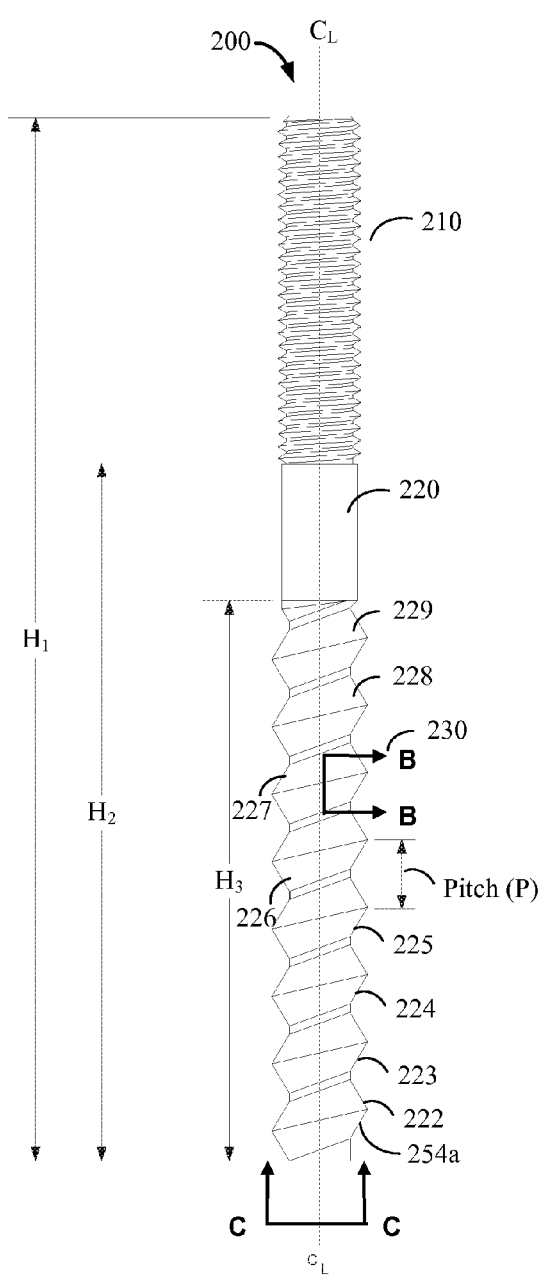
FIG. 2B
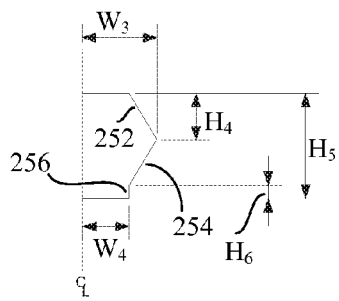
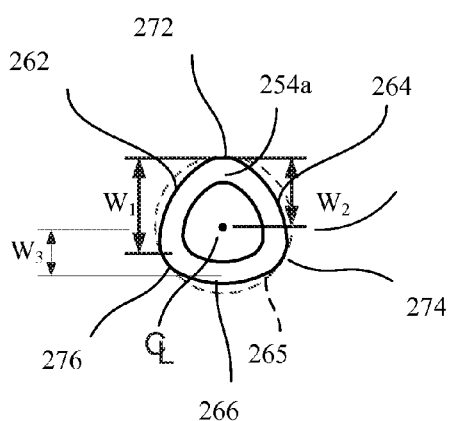
FIG. 2C

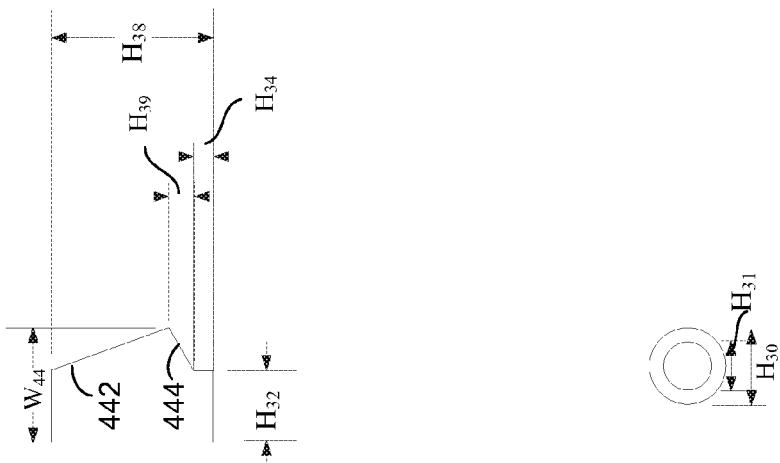
FIG. 4C
FIG. 4B
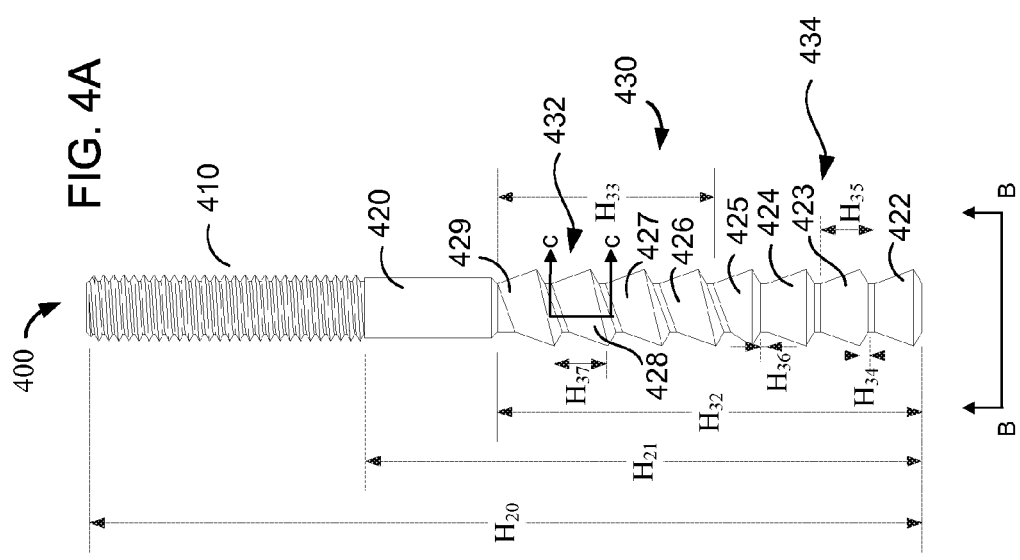
FIG. 4A

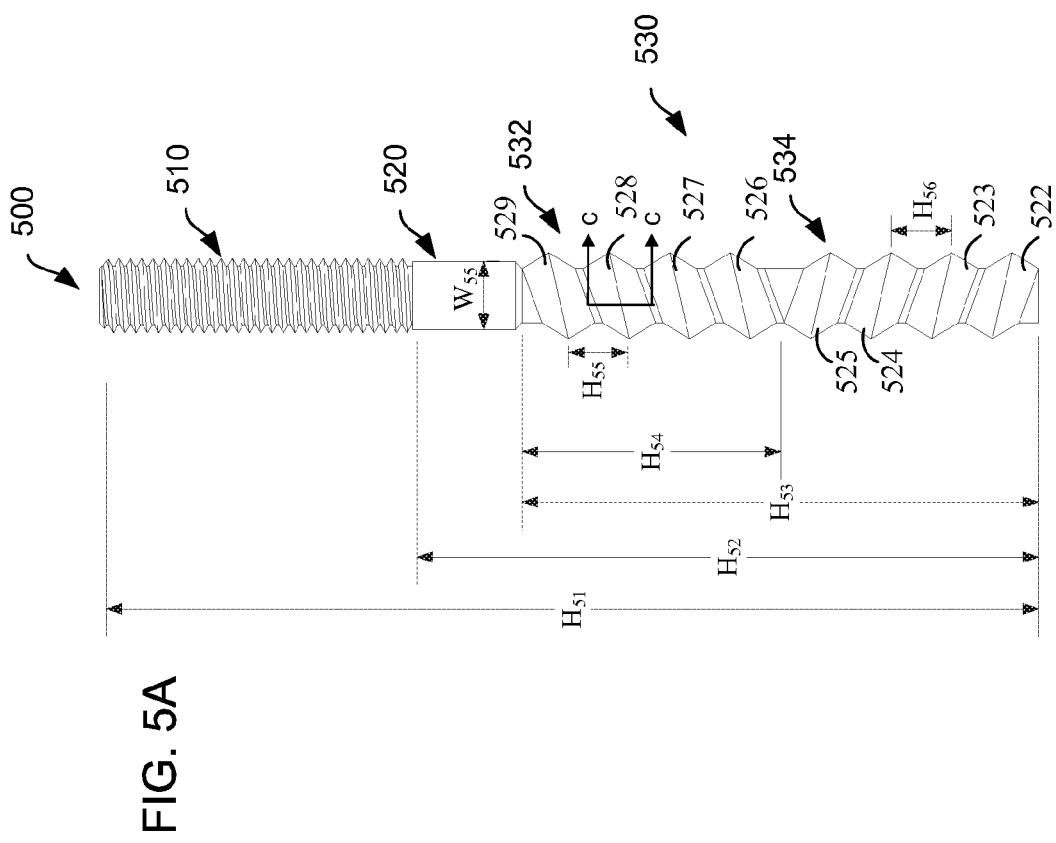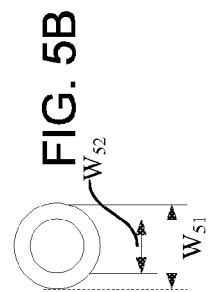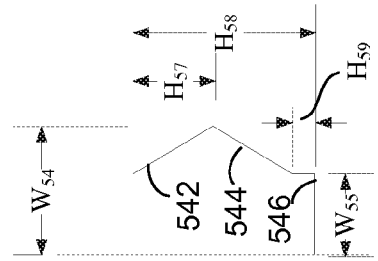

ANTI-ROTATIONAL ADHESIVE INSERT

BACKGROUND

Anchors have a number of applications in the construction industry. One exemplary use is in securing building foundations to the frame of the building. Building foundations transfer structural loads from the building safely to the ground. Foundations are subject to a number of different types of loads, including the dead load of the building, live loads such as of people, furnishings and changing elements in the building, wind loads, horizontal pressures of earth and water, and forces resulting from earthquakes. These loads can affect the building differently. For example, wind loads apply lateral, downward and uplift forces while earthquakes can apply horizontal and vertical forces.

To help secure the foundation to the building, anchors are embedded into concrete foundations to fasten a building frame to a foundation. Anchors can be used in the initial construction of a building or in retrofitting older building. Retrofit anchors, also referred to as post-installed anchors, may consist of an externally threaded portion at one end of the anchor and an insert portion another end of the anchor. The insert portion is designed to be installed in a pre-drilled hole in the concrete or masonry foundation. The insert portion of the anchor is then placed in the pre-drilled hole and set in the hole through the use of a strong epoxy adhesive or a mortar composition which binds to the concrete or masonry and the insert.

Due to the increasing use of post installed anchors, building codes now directly address the design and use of post-installed anchors. There are numerous designs which attempt to improve the performance of pre and post installed anchors have been conceived.

One prior art design is shown in FIG. 1. FIG. 1 illustrates a prior art insert rod such as that manufactured by Hilti Corporation under the name Hit-TZ. The insert rod 100 includes a helical insert section 125 and a threaded section 130. The helical section is designed to be inserted into a pre-drilled hole into which a mortar or other adhesive is provided to secure the insert rod in the hole. The hole is provided in a concrete or masonry block 110 and mortar or adhesive 140 surrounds the helical section 136. The building element 120 is secured to the concrete 110 by a nut 146 and washer 145, the nut having a thread which matches the thread 135 on threaded section 130 of insert 100.

The insert 100 is designed with a relatively smooth surface so that if the insert rod is installed in a section of mortar or concrete 110 which in which a crack 150 subsequently forms, any failure of bond will occur at the interface between the insert rod surface and the adhesive, in addition to any bond failure between the adhesive and the concrete 110.

If the failure occurs at the interface between the rod and the adhesive, it has been noted that the high pitch of the helical section of such inserts gives rise to a tendency of the bolt to unthread from the adhesive section under cyclic loads. This can result in a failure of the insert rod to secure a building element 120 to the concrete 110.

SUMMARY

The technology, roughly described, comprises an anchor suitable for securing a building element to a concrete foundation. The technology provides anti-rotation structures to anchors and is particularly suited to post-installed anchors used with a pre-drilled bore and secured therein by an adhesive.

In one embodiment, an anchor in accordance with the technology includes a first end and a second end, and comprises a threaded portion at the first end, the threaded portion having a circular cross-section. A securing portion is provided at the second end, the securing portion including an anti-rotation structure formed therein which resists rotation of the mechanical anchor under cyclic loading by the building element.

The anti-rotation structure may be a triobular cross-section formed in the securing portion. Other anti-rotation structures are provided.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2A is a plan view of a first embodiment of an adhesive insert provided herein.

FIG. 2B is a cross section along line B-B in FIG. 2A.

FIG. 2C is an end view along line C-C in FIG. 2A.

FIG. 4A is a plan view of a third embodiment of an adhesive insert provided herein.

FIG. 4B is an end view along line B-B in FIG. 4A.

FIG. 4C is a sectional view along line C-C in FIG. 4A.

FIG. 5A is a plan view of a fourth embodiment of an adhesive insert formed in accordance with the teachings herein.

FIG. 5B is an end view along line B-B in FIG. 5A.

FIG. 5C is a sectional view along line C-C in FIG. 5A.

DETAILED DESCRIPTION

Figure 1:
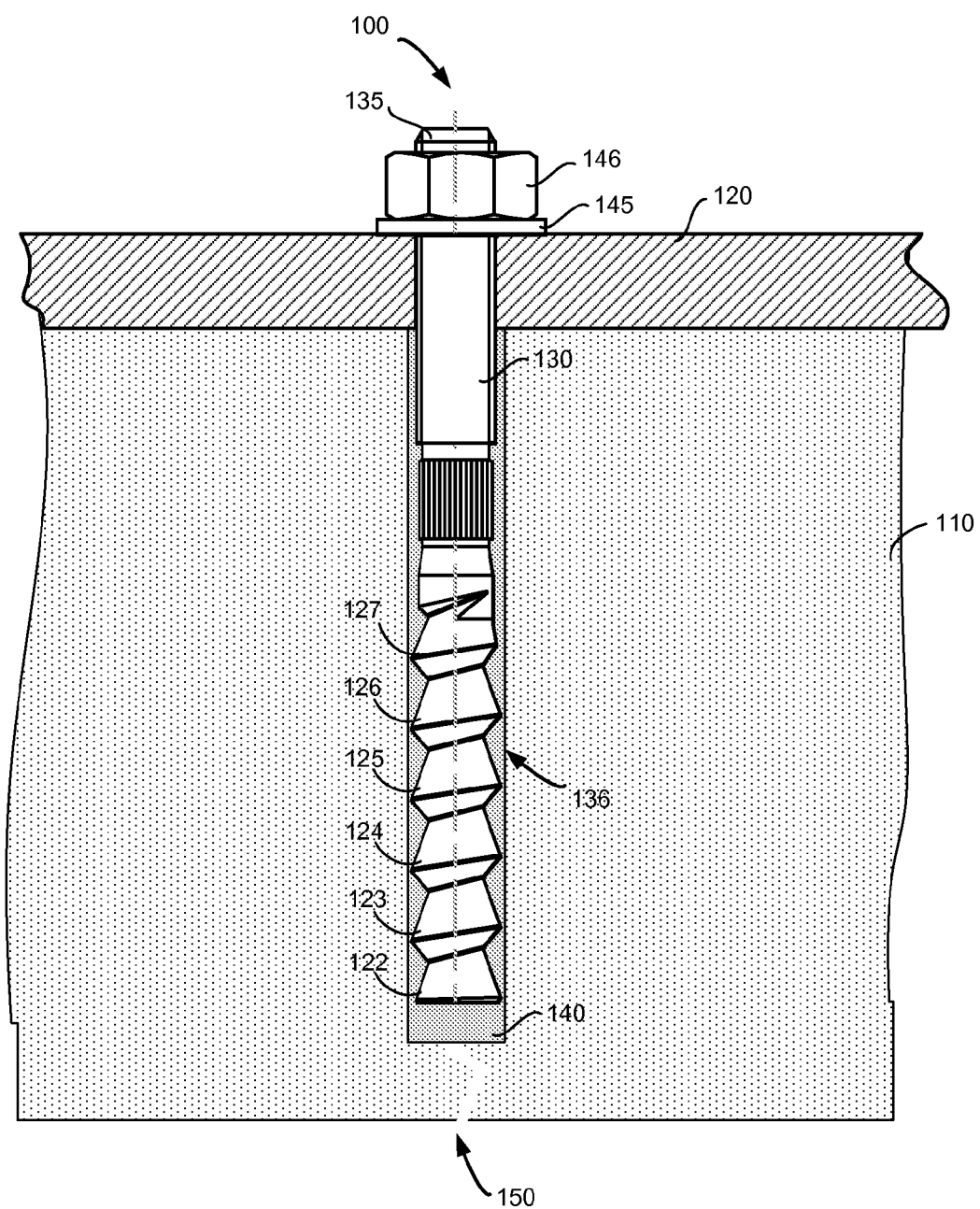
FIG. 1 is a depiction of a prior art post-installed anchor secured in concrete or masonry.

Improved anchoring technologies are disclosed herein. In one aspect, the anchors include technology to prevent the rotation of an adhesively secured anchor member in a pre-drilled hole. This prevents the anchor from rotating out of the hole when a failure occurs between the adhesive and the anchor member. Various embodiments of anti-rotation structures are disclosed herein. The technology provides the advantage that the resulting secured structure is better protected from any failure of the post-installed anchor member. The technologies are particularly suited to use with post-installed, adhesively secured anchor members.

FIG. 2A is a plan view of a first embodiment of an anchor member in accordance with the technology herein. An anchor member 200 includes a threaded portion 210 and a helical securing section 230 formed by a plurality of helical threads 222-229. Section 210 has a circular cross section having a diameter W2, (FIG. 2B) and a UNC outside thread which enables any UNC inside threaded nut of matching gauge to engage the threaded section to secure building elements to the anchor 200. A spacer section 220 separates a threaded portion 210 from helical portion 230. In one configuration, the helix threads are right-hand turned, but in alternative configurations may be left-hand turned.

As illustrated in FIG. 2B, each helical thread 222-229 is formed by an upper surface 252 and a lower surface 254, separated from adjacent threads by a spacer 256.

As illustrated in FIG. 2C, helical section 230 has a triobular cross section. Viewed from FIG. 2C, each turn has the same triobular cross section with three arcuate sides 262, 264, and 266 joined at three apexes 272, 274, and 276. The triobular cross section has a characteristic that a cross sectional distance W1 will be the same when measured between any two opposing points on sides 262, 264, and 266 or apexes 272, 274, and 276 which are 180 degrees apart relative to centerline CL of the insert 200. Note that the centerline CL is the centerline of the insert (and the center of the circumferential cross section of the threaded portion). The distance from the centerline to each apex is a distance W2, which can defined a the radius of a circle defined by dashed line 263 in FIG. 2C. In FIG. 2C, the triobular cross section is defined so that sides 272, 274 and 276 are aligned at any cross-section taken through the bolt. However, in alternative embodiments, the triobluar sides may be rotated with respect to other cross sections of the bolt.

When secured by an adhesive in a pre-drilled hole, any failure of the anchor occurring between the adhesive and the insert will not result in rotation of the insert under cyclic loads due to the triobular cross-section of the insert portion.

Each of the inserts discussed herein may be formed of SAE J404 grade 4140, 41L40, finished with a zinc plating, formed to a surface roughness of $R_a$ less than about 1.50 micrometers. Other types of steel, and other types of anchor materials, may be utilized without departing from the scope of the invention discussed herein. The inserts discussed herein may be formed to any number of different dimensions. Table 1 illustrates various dimensions for various embodiments of the insert 200 formed in accordance with the technology described herein:

TABLE 1

| Thread | Pitch (D) | H1 | W2 | W1 | H2 | H3 |
|---|---|---|---|---|---|---|
| 3/8–16 | 0.341 | 6.000 | 0.458 | 0.430 | 3.375 | 2.750 |
| 1/2–13 | 0.411 | 7.500 | 0.584 | 0.549 | 4.875 | 4.250 |
| 5/8–11 | 0.442 | 9.250 | 0.687 | 0.649 | 6.625 | 6.000 |
| 3/4–10 | 0.511 | 11.000 | 0.810 | 0.768 | 8.375 | 7.750 |

| W3 | H5 | H4 | H6 | W4 |
|---|---|---|---|---|
| 0.201 | 0.341 | 0.151 | 0.038 | 0.138 |
| 0.257 | 0.411 | 0.180 | 0.050 | 0.184 |
| 0.306 | 0.442 | 0.190 | 0.062 | 0.230 |
| 0.363 | 0.511 | 0.218 | 0.075 | 0.276 |

It will be understood that the various dimensions discussed herein are exemplary and not limiting on the scope of the present invention. In one aspect, the triobular cross section may be defined by the ratio of the distance (W2)/2, (the maximum distance from the centerline to the outer surface of an apex 272, 274, and 276) relative to the distance W3, (the maximum distance from the centerline CL to the outer surface of any arcuate side 262, 264, and 266). In one embodiment, this ratio is in a range of about 1.11:1-1.14:1. The ratios disclosed herein are merely exemplary and may vary according to the application for which the anchor is designed.

In accordance with the technology, the fastener 200 is installed by creating a pre-drilled hole in a concrete or masonry foundation and the helix section inserted into the hole. The depth of the hole is selected so that the threaded portion is exposed to secure a building element. An adhesive, such as an epoxy adhesive, is then filled in the hole and when cured, the anchor is secured in the foundation. Other adhesive chemistries may be used as well. When the helix section 230 is secured in this manner, any failure of the anchor due to the stresses imparted thereto should occur between the high helix section and the adhesive given the low surface roughness of the bolt. However, because of the triobular cross-section of the high helix section, the insert will resist rotation under circular loads. Any insert having a triobular cross section in conjunction with a helical section would benefit from the teachings of the technology discussed herein.

The insert of FIG. 2 has an advantage of being easily manufactured using standard anchor formation presses. The insert manufacturing process consists of heading, thread rolling and coating. Initially, the net shape of the insert is produced, generally by a cold forging process resulting in the overall insert shape. In this case, the securing section of the insert can be formed with the triobular shape before a thread rolling process is used to form the helical threads 222-229. Thread rolling is then applied to the helical section. Thread rolling is a bulk deformation, cold forming process applied by rolling the insert form through multiple dies. The thread rolling process provides good production rates, effective material usage, stronger threads, and good fatigue resistance. Insert 200 can thus be formed through conventional cold-forming processes and is hence easy to manufacture.

Figure 3A:
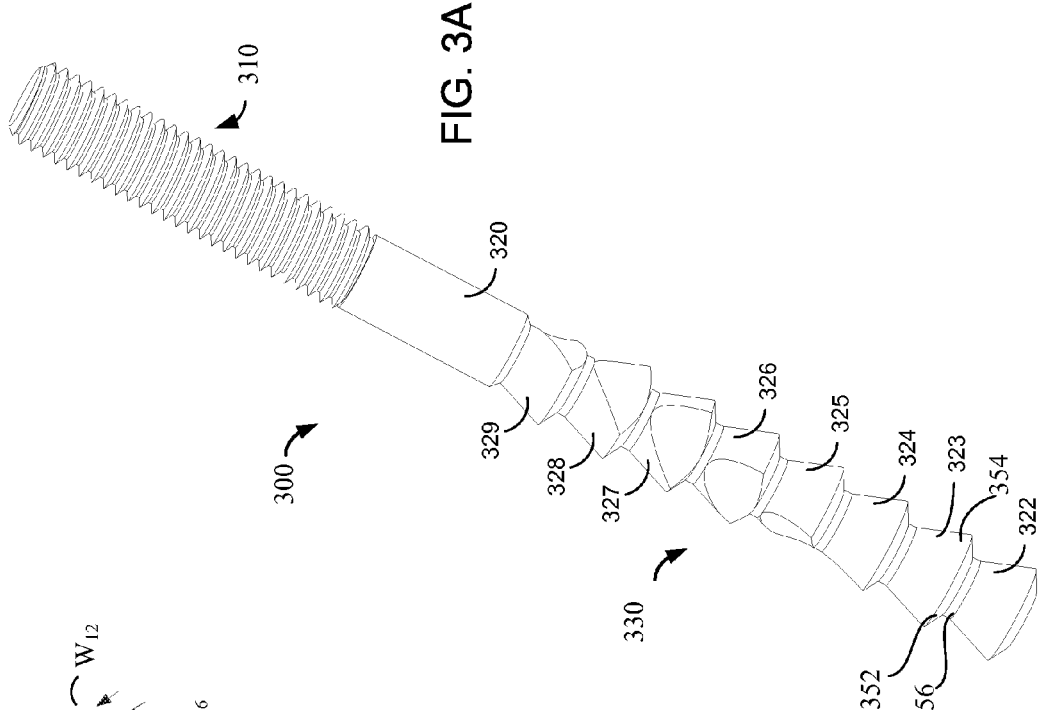
FIG. 3A is a prospective view of a second embodiment of an adhesive insert in accordance with the present invention.
Figure 3C:
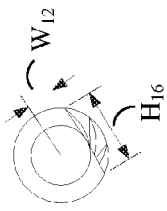
FIG. 3C is an end view along line C-C in FIG. 3B.
Figure 3B:
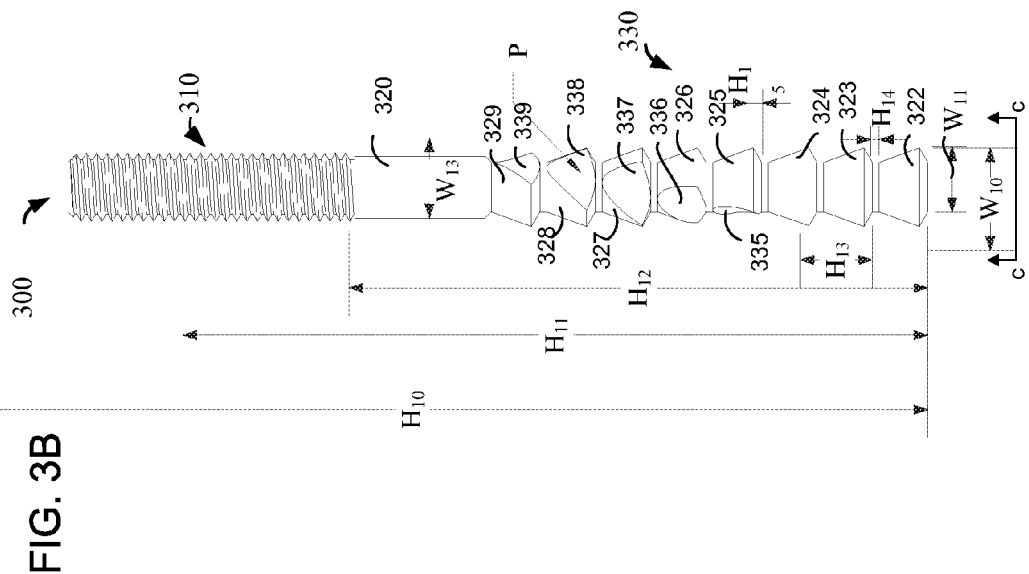
FIG. 3B is a plan view of the adhesive insert of FIG. 3A.

FIG. 3B is a perspective view of the second embodiment of the technology disclosed herein including an anti-rotational structure. Insert 300 includes a threaded section 310, a spacer 320 and a securing or conical section 330. In this embodiment, the anti-rotational structure comprises a series of flattened sections or cut outs 335, 336, 337, 338, and 339 provided on securing section 330 of an insert 300.

The securing section includes a polarity of conical elements 332, 323, 324, 325, 326, 327, 328, and 329. At least some of the conical elements have cut out sections 335 through 339, respectively. In one embodiment, all of the elements have cutouts, but they are not all visible on the drawing. In another embodiment, only a subset of the elements has cut-outs. The cut outs rotate around the axis of the part to prevent a shear plane that gives lower resistance to stripping through the adhesive.

As illustrated in FIG. 3B, the insert 300 may be manufactured to any of the different thread models listed in Table 1. In one embodiment where insert 300 has a height H10 of 6.375 inches, H11 is 4.25 inches and H12 is 3.23 inches. In this embodiment, spacer 320 has a width W13 of 0.46 inch., and each conical element a maximum width of W10 of approximately 0.58 inch. As illustrated in FIG. 3B with respect to conical section 323, each conical section includes an upper surface 354 and a lower surface 352, and is separated from adjacent conical elements by a spacer 356. Each spacer has a circumferential cross section having a diameter W11 of 0.367 inch.

In this embodiment, cut out sections are spaced a distance W12 from the center line of 0.184 inches and have a surface which is approximately 0.545 inches in length (H16) (FIG. 3C). The cut out sections may be formed to be any number of shapes and distances from the center line CL. In the illustrated embodiment, the cut-out sections form an indented helical thread having a pitch P which would complete one turn of the securing section or about 3.238 inches. Each conical section has a height H13 of approximately 0.41 inches, and is spaced apart from adjacent conical sections by a distance H14 of approximately 0.050 inch. The lower surface (for example surface 352) of each conical section has a height H15 of approximately 0.063 inch while the upper surface (for example surface 354) has a height of approximately 0.348 inch.

Insert 300 may be formed of materials such as those set forth above with respect to insert 200 shown in FIGS. 2A through 2C. Installation and the function of the insert 300 are equivalent to those set forth above with respect to insert 200. In this case, the anchor member is prevented from rotation by helical cut out sections provided on the securing section 330.

FIGS. 4A through 4C show another alternative of the technology discussed herein. An anchor member 400 includes a securing section 430 having a circular cross section along with a threaded section 410 and spacer section 420.

In this embodiment, the securing section includes a helical section 432 and a non-helical section 434. Helical section includes turns 426-429, while non-helical section 434 includes conical elements 422-425. Each turn in the helical section includes a thread defined by an upper surface 442 having a height of 0.348 and a lower surface 444 having a height H39 of 0.063 inch, illustrated in FIG. 4C. Likewise, each non-helical conical member 422 includes an upper surface 442 and lower surface 444.

In this embodiment, the non-helical section will prevent loosening of the anchor since any rotation of the insert in the direction out of the hole will have the effect of wedging sections 422-425 against the adhesive in the bore.

Again, insert 400 may be formed of any number of different dimensions. In one embodiment, heights H20, H21 and H32 are equivalent to dimensions H10, H11 and H12 of FIG. 3B. The upper section 432 has a height H33 of approximately 1.644 inch while the height H32 of the securing section is approximately 3.23 inch. The pitch (H37) of the threaded section is approximately 0.411 inch. The conical sections may all have a height H38 of approximately 0.411 inch, and are spaced apart by a distance H36 from approximately 0.050 inch. The diameter H30 of the securing section may be approximately 0.584 inch and that of the spacer sections separating the turns (H31) 0.367 inch.

Insert 400 may be manufactured of the same or equivalent materials as those used for insert 200 and is installed in a like manner using the same or equivalent materials.

FIGS. 5A through 5C show yet another alternative embodiment of the present technology wherein the securing section 530 is provided with reversed threaded helical profiles. As shown in FIG. 5A, insert 500 includes a securing section 530, a threaded section 510 and a spacer 520. The securing section 530 includes a forward or right hand thread section 532 and a left hand thread section 534. Securing section 530 includes a plurality of threads 522-529, including a first set of threads 522-525 with a left hand turn and a second set of threads 526-529 with a right hand turn.

As illustrated in FIGS. 5A and 5C, each helical thread 522-529 is formed by an upper surface 542 and a lower surface 544, separated from adjacent threads by a spacer 546. When a load is placed on the anchor, due to the smooth surface of the anchor, failure occurs between the adhesive and the anchor, and the upper surfaces of the threads engage the adhesive to prevent movement of the anchor.

As will be generally understood, when the insert is secured in a pre-drilled hole in an adhesive, the anchor will resist rotation due to cyclic loads due to the reverse threading of the securing section.

Insert 500 may be manufactured of the same or equivalent materials as those used for insert 200 and is installed in a like manner using the same or equivalent materials. Insert 500 may be formed of any number of different dimensions. In one embodiment, the pitch H55 of the right hand thread section is equivalent to the pitch H56 of the left hand thread section. In alternative embodiments the pitch may be different. The height H54 of each threaded section is approximately 1.753 inch and the overall height of the securing section is 3.505 inch. As shown in FIG. 5C, the height of each overall turn may be H58 of approximately 0.411 inch, with the upper wall 542 having a height H57 of approximately 0.18 inch and the lower wall 544 having the same height. Alternatively, the upper and lower walls may have different heights as in previous embodiments.

Each thread is spaced apart from adjacent threads by a spacer H59 of approximately 0.050 inch. The outer height W54 of each thread is approximately 0.292 inches, with the radius of the turn in the spacer section between adjacent threads being approximately 0.184 inches (W55). The total height H51 of the anchor is 6.375 inch, the height H52 of the spacer and securing section 4.250 inch, and height H53 is 3.505 inch. The height H54 of each section is about 1.75 inch Each thread a radius W55 of 0.184 inch, a diameter W51 of 0.584 inch, with the spacers having a diameter W52 of 0.367 inch.

Numerous advantages result from the use of the aforementioned anchor technology. While the technology has been described with respect to post-installed anchors, it will be recognized that the teachings herein are not limited to post-installed anchors. In addition, while the technology is advantageously employed in applications where a pre-drilled hole is formed before the anchor is inserted, the anchor may be provided in poured concrete foundations as well.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. An adhesive insert suitable for securing a building element to concrete, the anchor having a first end and a second end and including:
   a threaded portion at the first end, the threaded portion having a circular cross-section; and
   a securing portion at the second end, the securing portion including a plurality helical threads having a constant pitch forming an anti-rotation structure, each thread formed by a continuous upper helical surface and a corresponding continuous helical lower surface separated from adjacent threads by a spacer and having a tri-obular cross-section, the anti-rotation structure resisting rotation of the anchor under cyclic loading by the building element.

2. The adhesive insert of claim 1 wherein the threaded portion extends above the foundation and receives a UNC threaded nut to secure the building element.

3. The adhesive insert of claim 1 wherein the securing section includes the helical turn having a pitch of about 0.3 inch to 0.6 inch.

4. An adhesive insert suitable for securing an element to a concrete foundation, the insert including:
   a threaded portion having a circular cross-section capable of receiving a threaded nut; and
   a securing portion comprising a plurality of helical threads each having a constant pitch and a triobular cross section, each thread formed by an upper continuous helical surface and a lower continuous helical surface separated from adjacent threads by a spacer.

5. The adhesive insert of claim 4 wherein the triobular cross section includes a first, second and third arcuate sides joined at a first, second, and third apexes, respectively.

6. The adhesive insert of claim 5 wherein the triobular cross section is defined such that a distance measured between any two opposing points the sides or apexes which are 180 degrees apart relative a centerline of the insert will be equal.

7. The adhesive insert of claim 5 wherein a ratio of a maximum distance from a centerline of the anchor to one of said apexes and a maximum distance from a centerline to a face of any arcuate side is about 0.8:1-0.99:1.

8. The adhesive insert of claim 5 wherein a ratio of a maximum distance from a centerline of the anchor to one of said apexes and a maximum distance from a centerline to a face of any arcuate side is in a range of about 0.87:1-0.9:1.

9. An system for securing an adhesive insert suitable for use in a pre-drilled hole, comprising;
   a threaded portion at a first end for the adhesive insert, the threaded portion having a circular cross-section;
      an insert section including one or more continuous helical threads having a constant pitch, each of said helical threads having a triobular cross-section and formed by a continuous upper surface and a continuous lower surface; and
   an adhesive surrounding the insert section in the pre-drilled hole and in contact with the hole and the insert section.

10. The adhesive insert of claim 9 wherein the triobular cross section includes a first, second and third arcuate sides joined at a first, second, and third apexes, respectively.

11. The adhesive insert of claim 10 wherein the triobular cross section is defined such that a distance measured between any two opposing points the sides or apexes which are 180 degrees apart relative a centerline of the insert will be equal.

12. The adhesive insert of claim 10 wherein a ratio of a maximum distance from a centerline of the anchor to one of said apexes and a maximum distance from a centerline to a face of any arcuate side is about 0.8:1-0.99:1.

13. The adhesive insert of claim 12 wherein the maximum distance from a centerline of the anchor to one of said apexes is in a range of about 0.2 to 0.5 inch.

14. The adhesive insert of claim 12 wherein the maximum distance from the centerline to a face of any arcuate side is in a range of about 0.2-0.4 inch.

15. The adhesive insert of claim 10 wherein a ratio of a maximum distance from a centerline of the anchor to one of said apexes and a maximum distance from a centerline to a face of any arcuate side is in a range of about 0.87:1-0.9:1.

16. A system for anchoring a foundation, comprising:
   an axially extending rod having leading end inserted into the pre-drilled bore and a trailing end, the trailing end including a threaded portion having a circular cross-section, the leading end having a securing region with a helical profile extending from the leading end towards the trailing end on an outer surface, wherein the profile includes an anti-rotation structure formed in the profile which inhibits rotation of the insert under cyclic loads applied to the rod, the anti-rotation structure comprising a plurality helical threads having a constant pitch, each thread formed by an upper continuous helical surface angled with respect to a lower continuous helical surface, each thread separated from adjacent threads by a spacer and having a triobular cross-section; and
   an adhesive surrounding the anti-rotation section and in contact with the hole and the insert section.

17. The adhesive insert of claim 16 wherein the securing section includes a helical turn having a pitch of about 0.3 inch to 0.6 inch.

18. The adhesive insert of claim 16 wherein the triobular cross section includes a first, second and third arcuate sides joined at a first, second, and third apexes, respectively.

19. The adhesive insert of claim 18 wherein the triobular cross section is defined such that a distance measured between any two opposing points the sides or apexes which are 180 degrees apart relative a centerline of the insert will be equal.

20. The adhesive insert of claim 19 wherein a ratio of a maximum distance from a centerline of the anchor to one of said apexes and a maximum distance from a centerline to a face of any arcuate side is about 0.87:1-0.9:1.

* * * * *

UNITED STATES PATENT AND TRADEMARK OFFICE
CERTIFICATE OF CORRECTION

PATENT NO.         : 7,802,951 B2                                                   Page 1 of 1
APPLICATION NO.    : 11/612356
DATED              : September 28, 2010
INVENTOR(S)        : Houck et al.

It is certified that error appears in the above-identified patent and that said Letters Patent is hereby corrected as shown below:

On the Title page, item (73): After "Assignee:" delete "Sandisk Corporation, Milpitas, CA (US)" and substitute therefor -- SIMPSON STRONG-TIE COMPANY, INC., Pleasanton, CA (US) --

Signed and Sealed this
Fifteenth Day of February, 2011

David J. Kappos
*Director of the United States Patent and Trademark Office*